(12) United States Patent
Asada

(10) Patent No.: US 7,156,010 B2
(45) Date of Patent: Jan. 2, 2007

(54) DISK CUTTER

(75) Inventor: Tanehiko Asada, Iwata-gun (JP)

(73) Assignee: Tenryu Seiko Kabushiki Kaisha, Iwata-gun (JP)

( * ) Notice: Subject to any disclaimer, the term of this patent is extended or adjusted under 35 U.S.C. 154(b) by 151 days.

(21) Appl. No.: 11/052,916

(22) Filed: Feb. 9, 2005

(65) Prior Publication Data

US 2006/0107815 A1 May 25, 2006

(30) Foreign Application Priority Data

Nov. 22, 2004 (JP) ............................. 2004-337189

(51) Int. Cl.
*B23D 61/02* (2006.01)
*B27B 33/08* (2006.01)
(52) U.S. Cl. .......................... 83/835; 83/676
(58) Field of Classification Search .......... 83/835–855, 83/676; D8/20
See application file for complete search history.

(56) References Cited

U.S. PATENT DOCUMENTS

| | | | | |
|---|---|---|---|---|
| 4,574,676 A | * | 3/1986 | Jansen-Herfeld | 83/835 |
| 4,794,835 A | * | 1/1989 | Fujiyoshi | 83/835 |
| 5,438,900 A | * | 8/1995 | Sundstrom | 83/835 |
| 5,524,518 A | * | 6/1996 | Sundstrom | 83/835 |
| 5,555,788 A | * | 9/1996 | Gakhar et al. | 83/835 |
| D485,478 S | * | 1/2004 | Sakai | D8/20 |
| 6,688,206 B1 | * | 2/2004 | Mummenhoff | 83/676 |
| 2003/0056633 A1 | * | 3/2003 | Baron et al. | 83/835 |

FOREIGN PATENT DOCUMENTS

| | | | |
|---|---|---|---|
| EP | 239676 | * | 10/1987 |
| EP | 243909 | * | 11/1987 |
| EP | 640422 | * | 3/1995 |
| JP | 02292118 | * | 12/1990 |
| JP | 04002410 | * | 1/1992 |
| JP | 04053701 | * | 2/1992 |
| JP | 2001-38525 | | 2/2001 |
| WO | WO-8705556 | * | 9/1987 |

* cited by examiner

*Primary Examiner*—Stephen Choi
(74) *Attorney, Agent, or Firm*—Armstrong, Kratz, Quintos, Hanson & Brooks, LLP

(57) ABSTRACT

A disk cutter including an annular disk-shaped base, a plurality of tip supports formed integrally along an outer circumference of the base, a gullet is defined between adjacent ones of the tip supports, a plurality of tip inserts respectively fixed to the tip supports, a plurality of outer slits formed at an outer circumferential portion of the base at given intervals, each of the outer slits having an outer end opening to the gullet, a plurality of intermediate slit pairs formed at a radially intermediate portion of the base at the given intervals, each of the intermediate slit pairs is located between adjacent ones of the outer slits. Each intermediate slit pair includes a substantially J-shaped first slit and a substantially inverted J-shaped second slit arranged in point symmetrical relationship with the first slit. Each of the first and second slits is filled with a viscous material.

3 Claims, 4 Drawing Sheets

DISK CUTTER

BACKGROUND OF THE INVENTION

1. Field of the Invention

The present invention relates to a disk cutter or circular saw suitable for cutting of wood, steel, etc.

2. Description of the Related Art

A disk cutter or tip saw including a base disk having a plurality of tip supports arranged along the outer circumference and a plurality of hardened cutting tip inserts (cutter inserts) respectively fixed to the tip supports by brazing or the like is frequently used for board cutting or the like. The tip supports are spaced at given intervals in the circumferential direction of the base disk or annular disk-shaped base, and a gullet is defined between adjacent ones of the tip supports. Each tip support has a recess, and each hardened cutting tip insert is fixed in the recess of the corresponding tip support by brazing or the like.

The base disk has a first mounting hole at its central portion, and a boss portion of a collar is inserted through the first mounting hole. The boss portion of the collar is formed with a second mounting hole, and a rotating shaft of a rotary tool is inserted through the second mounting hole. The disk cutter is mounted to the rotary tool by fastening the base disk through the collar to the rotating shaft with a bolt.

Japanese Patent Laid-open No. 2001-38525 discloses a disk cutter including an annular disk-shaped base and a plurality of radially extending outer slits formed at an outer circumferential portion of the base so as to be arranged at given intervals, each of the outer slits being filled with a viscous material having viscosity at ordinary temperature. This disk cutter disclosed in Japanese Patent Laid-open No. 2001-38525 has an excellent effect such that the viscous material filled in each outer slit can mainly attenuate high-frequency vibrations of the base. However, since each outer slit is formed to mainly attenuate high-frequency vibrations, low-frequency vibrations of 1 kHz or less cannot be sufficiently attenuated.

SUMMARY OF THE INVENTION

It is therefore an object of the present invention to provide a disk cutter which can sufficiently attenuate vibrations occurring in operation over a wide range from low frequencies to high frequencies.

In accordance with an aspect of the present invention, there is provided a disk cutter comprising an annular disk-shaped base adapted to be driven about an axis of rotation; a plurality of tip supports formed along the outer circumference of the base integrally therewith so that a gullet is defined between adjacent ones of the tip supports; a plurality of tip inserts respectively fixed to the tip supports; a plurality of outer slits formed at an outer circumferential portion of the base so as to be arranged at given intervals, each of the outer slits having an outer end opening to the gullet; and a plurality of intermediate slit pairs formed at a radially intermediate portion of the base so as to be arranged at the given intervals in such a manner that each of the intermediate slit pairs is located between adjacent ones of the outer slits. Each of the intermediate slit pairs has a substantially J-shaped first slit and a substantially inverted J-shaped second slit arranged in point symmetrical relationship with the first slit. The first and second slits have straight portions parallel to each other, the spacing W between the straight portions of the first and second slits and the thickness t of the base being set so as to satisfy the relation of $0.4 \leq W/t \leq 1.1$.

Each of the first and second slits is filled with a viscous material having viscosity at ordinary temperature.

Preferably, each of the outer slits comprises a radially extending outer portion having a larger width, an arcuate portion having a smaller width and continuing at one end to the inner end of the outer portion, and a hole continuing to the other end of the arcuate portion. The arcuate portion is filled with the viscous material. Preferably, the viscous material contains a colored pigment except a white pigment and a black pigment.

According to the present invention, high-frequency vibrations can be mainly attenuated by the plural outer slits, and low-frequency vibrations can be mainly attenuated by the plural intermediate slit pairs. Accordingly, vibrations occurring in operation can be efficiently attenuated over a wide range from low frequencies to high frequencies.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
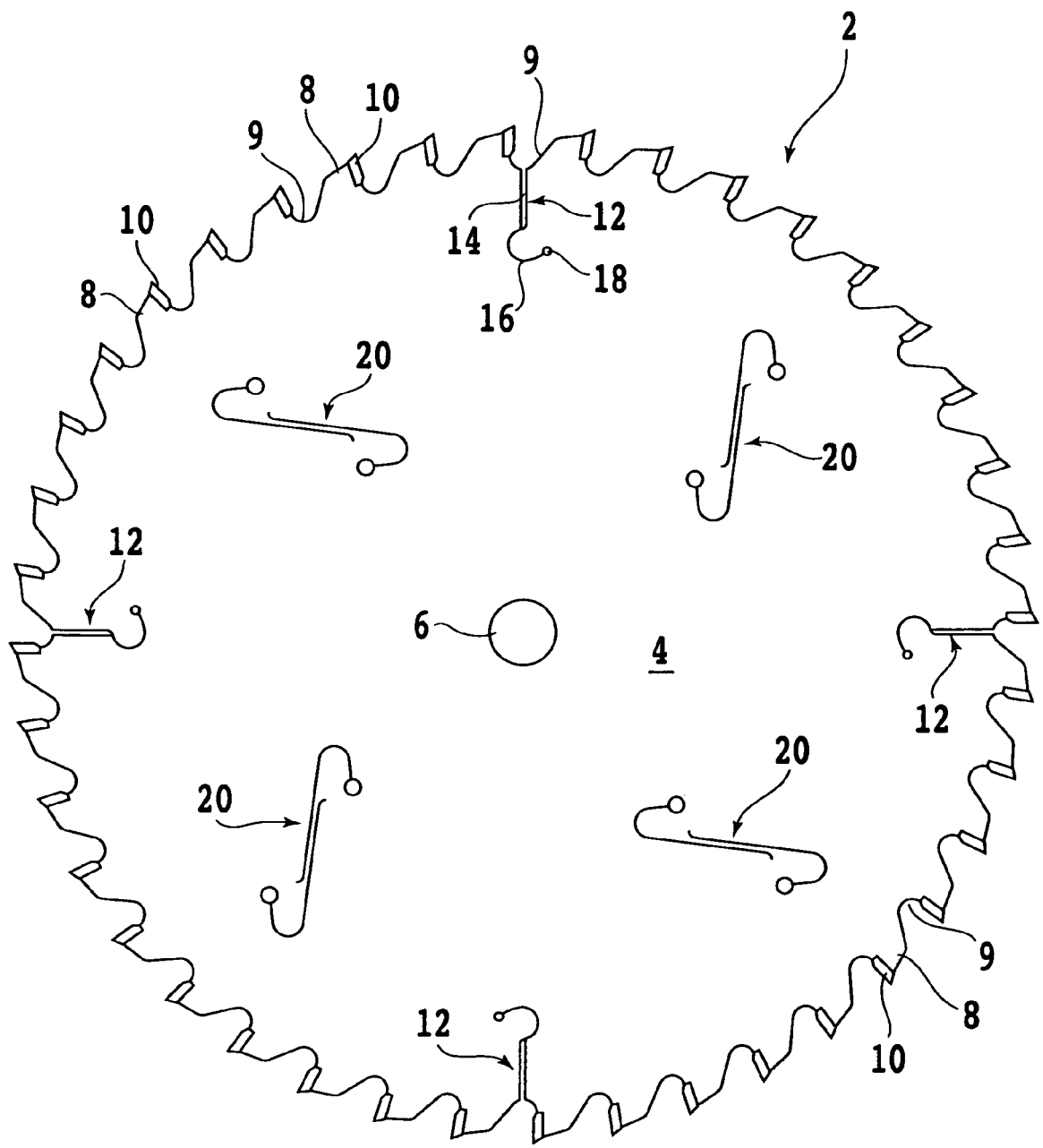
FIG. 1 is a side view of a disk cutter according to a preferred embodiment of the present invention.

Referring to FIG. 1, there is shown a side view of a disk cutter 2 according to a preferred embodiment of the present invention. The disk cutter 2 is suitable for cutting of wood, steel, etc. The disk cutter 2 includes an annular disk-shaped base (base disk) 4 having a thickness of about 1.8 mm and a plurality of (e.g., 40) saw-toothed tip supports 8 formed along the outer circumference of the base disk 4 at equal intervals. A gullet 9 is defined between adjacent ones of the tip supports 8. The base disk 4 is formed of steel such as JIS SKS5 (alloy tool steel), JIS SK5 (carbon tool steel), or JIS SK6 (carbon tool steel). The diameter of the base disk 4 is about 255 mm, for example, and the base disk 4 has a central hole 6 having a diameter of about 16 mm, for example. However, these values are merely illustrative, and the disk cutter of the present invention is not limited to this preferred embodiment.

Each tip support 8 is formed with a recess (not shown), and a tip insert 10 is fixed in each recess by brazing or the like. Each tip insert 10 is formed of a greatly hard material such as cemented carbide as specified by JIS K10 or K20. A plurality of (e.g., four) outer slits 12 are formed at an outer circumferential portion of the base disk 4 so as to be arranged at given intervals (e.g., 90° intervals) in the circumferential direction of the base disk 4. Each outer slit 12 includes a radially extending outer portion 14 having a larger width (e.g., about 1.2 mm) and opening at the outer end thereof to the gullet 9, an arcuate portion 16 having a smaller width (e.g., about 0.2 to 0.3 mm) and continuing at one end to the inner end of the outer portion 14, and a hole 18 having a diameter of about 2.5 mm and continuing to the other end of the arcuate portion 16.

Each outer slit 12 is formed by laser machining. The reason for making the outer portion 14 of each outer slit 12 wider is to prevent the outer portion 14 from being clogged with chips of wood or the like. The arcuate portion 16 of each outer slit 12 is filled with a viscous material. This viscous material has viscosity at ordinary temperature. Examples of this viscous material include uncured chloroprene rubber and styrene butadiene rubber with a low degree of progress of cross-linking. Preferably, the viscous material contains a colored pigment except a white pigment and a black pigment. For example, a red pigment is contained in the viscous material. The color of this pigment is selected from any colors that can be easily distinguished from the surface color of the base 4. Usually, the surface color of the base 4 is white (metallic color) as the base color of SKS-5 or SK-5, for example, or the color of a plating coated on the base 4. Accordingly, the color of the pigment is preferably selected from red, yellow, and green as the color that can be easily distinguished from the surface color of the base 4.

Figure 2:
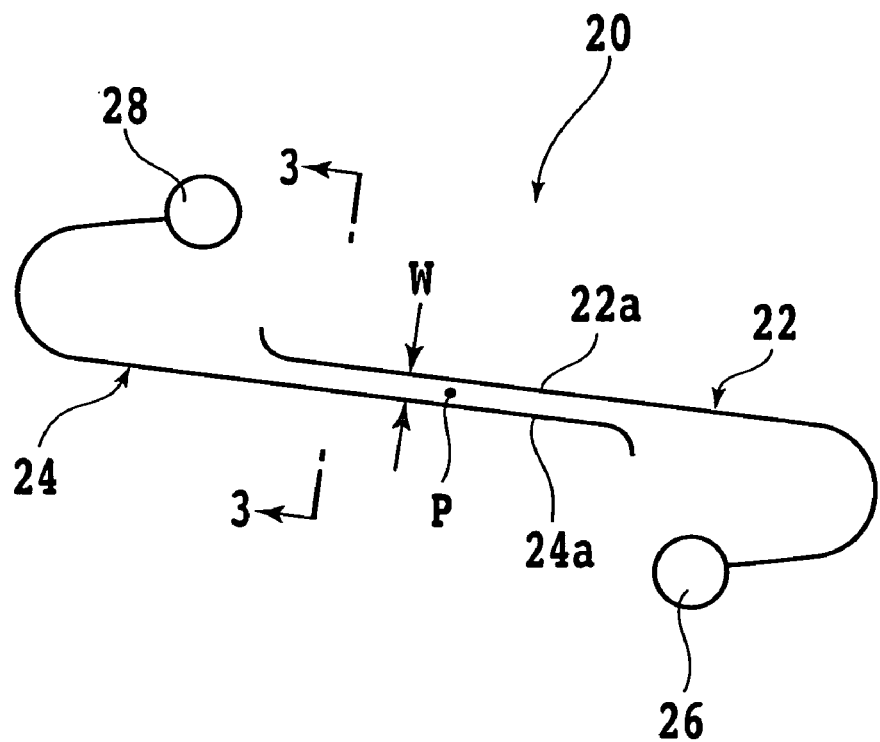
FIG. 2 is an enlarged view of an intermediate slit pair.

A plurality of (e.g., four) intermediate slit pairs 20 are formed at a radially intermediate portion of the base 4 so as to be arranged at given intervals (e.g., 90° intervals) in the circumferential direction of the base 4 in such a manner that each intermediate slit pair 20 is located between adjacent ones of the outer slits 12. As shown in FIG. 2, each intermediate slit pair 20 includes a substantially J-shaped first slit 22 and a substantially inverted J-shaped second slit 24 arranged in symmetrical relationship with the first slit 22 with respect to a point P. The first and second slits 22 and 24 have straight portions 22a and 24a, respectively. These straight portions 22a and 24a are parallel to each other. Holes 26 and 28 each having a diameter of about 4 mm are formed at the opposite ends of the first and second slits 22 and 24, respectively. The first and second slits 22 and 24 are formed by laser machining, and each of the first and second slits 22 and 24 has a width of about 0.2 to 0.3 mm.

Figure 3:
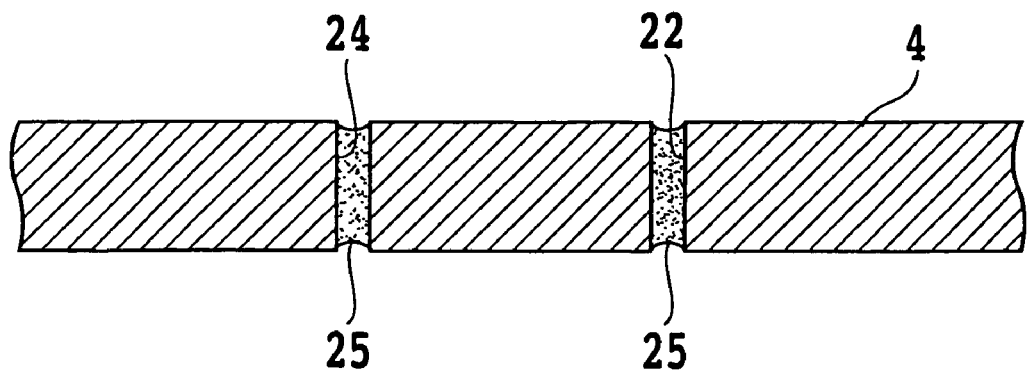
FIG. 3 is a cross section taken along the line 3–3 in FIG. 2.

As shown in FIG. 3, each of the first and second slits 22 and 24 is filled with a viscous material 25. The viscous material 25 has viscosity at ordinary temperature. Examples of the viscous material 25 include uncured chloroprene rubber and styrene butadiene rubber with a low degree of progress of cross-linking. Preferably, the viscous material 25 contains a colored pigment except a white pigment and a black pigment. For example, a red pigment is contained in the viscous material 25. The color of this pigment is selected from any colors that can be easily distinguished from the surface color of the base 4. Usually, the surface color of the base 4 is white (metallic color) as the base color of SKS-5 or SK-5, for example, or the color of a plating coated on the base 4. Accordingly, the color of the pigment is preferably selected from red, yellow, and green as the color that can be easily distinguished from the surface color of the base 4.

Figure 4:
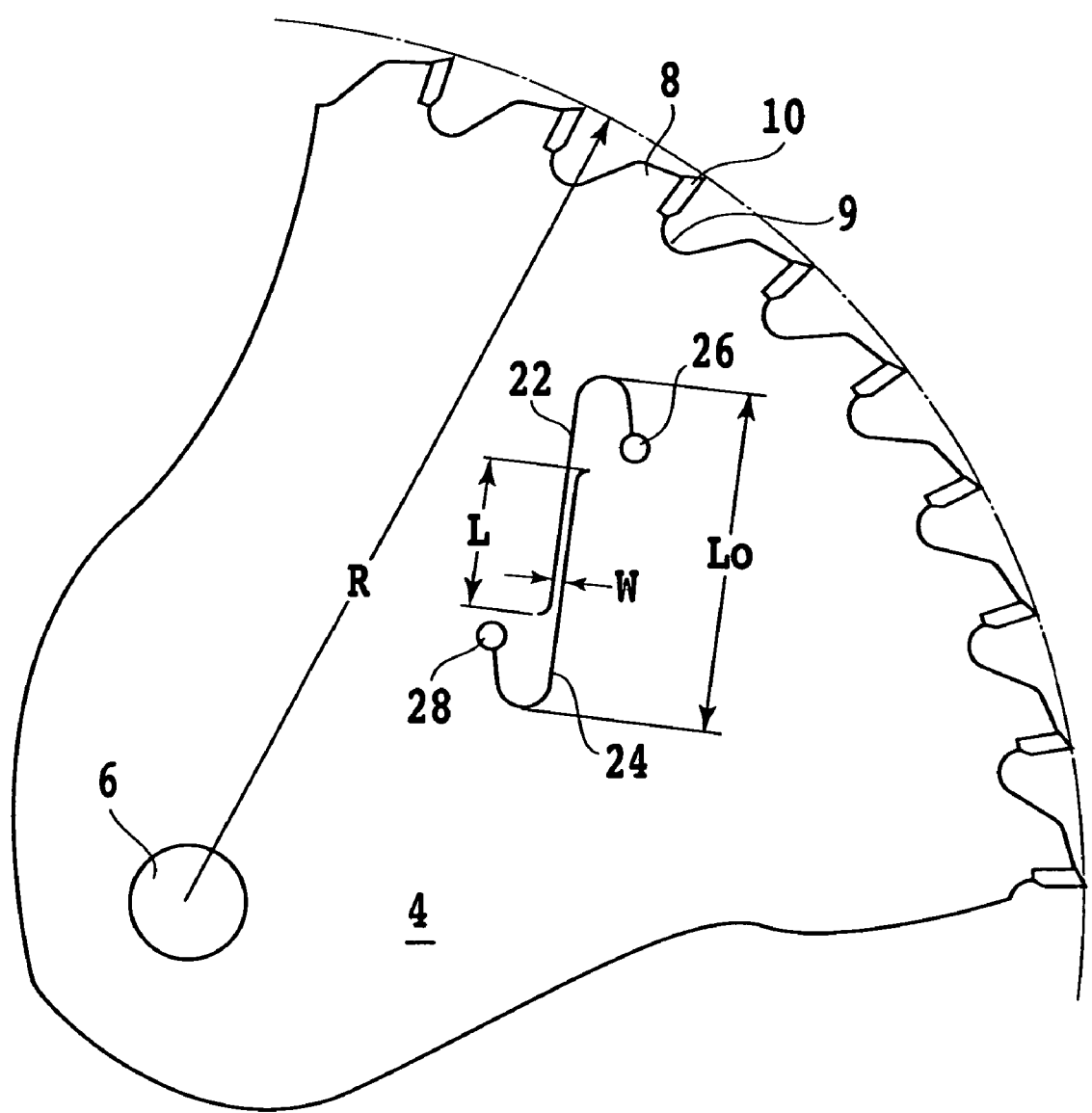
FIG. 4 is a fragmentary view for illustrating a dimensional relation between parts of the intermediate slit pair.
Figure 5:
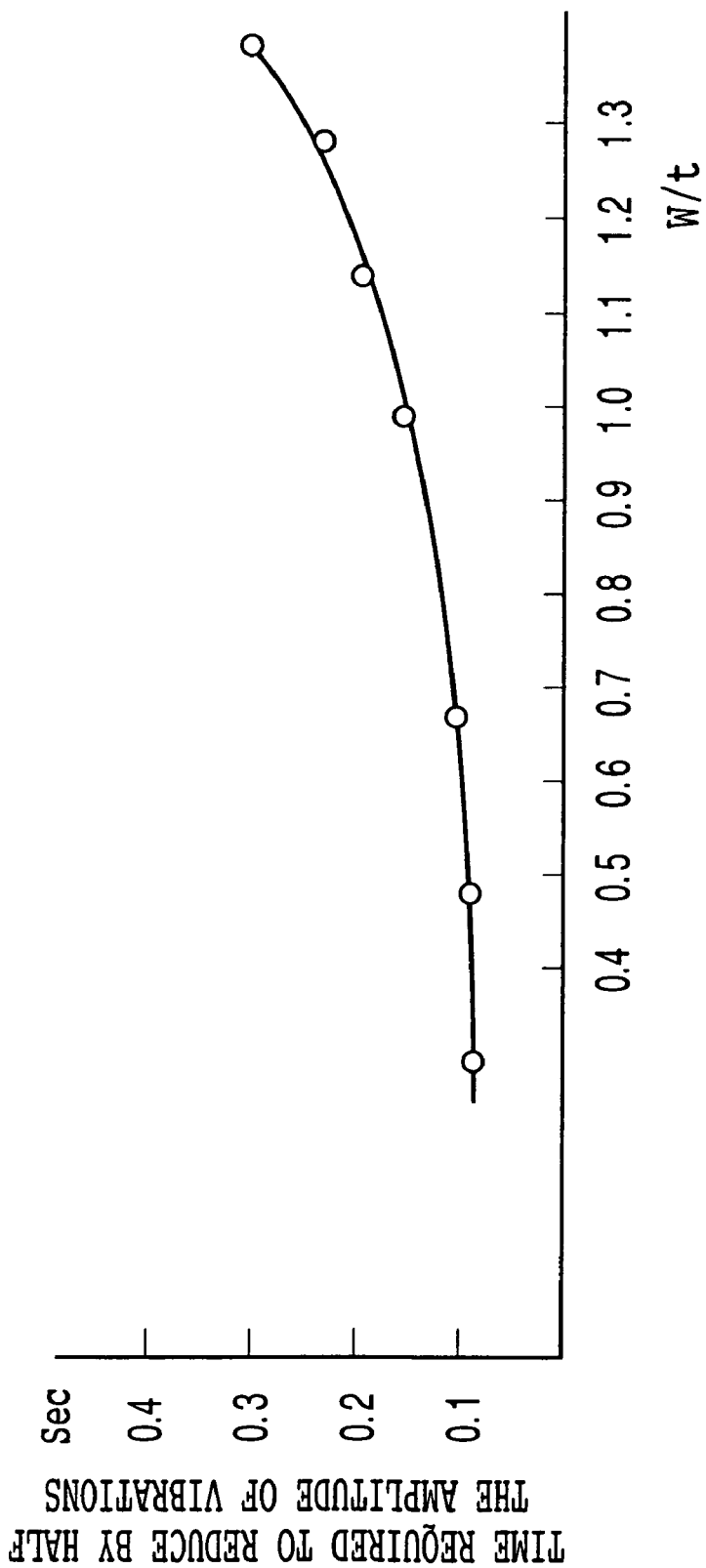
FIG. 5 is a graph showing the relation between W/t and the time required to reduce by half the amplitude of vibrations of the disk cutter.

Letting R denote the radius of the disk cutter 2, W denote the spacing between the straight portions 22a and 24a of the first and second slits 22 and 24, t denote the thickness of the base 4, and L and $L_0$ denote the lengths as specified in FIG. 4, $L_0/R$ is preferably set to 0.5 or less from the viewpoint of the rigidity of the base 4. Further, $L/L_0$ is preferably set to 0.7 or less and W/t is preferably set to 0.4 or more from the viewpoint of the resistance to rupture. FIG. 5 shows the relation between W/t and the time required to reduce by half the amplitude of vibrations of the disk cutter 2. As apparent from FIG. 5, when W/t becomes greater than 1.1, the time required to reduce by half the amplitude is undesirably increased. Accordingly, W/t is preferably set in the range of $0.4 \leq W/t \leq 1.1$.

According to this preferred embodiment, high-frequency vibrations of 3 kHz or more can be mainly attenuated by the plural outer slits 12, and low-frequency vibrations of 1 kHz or less can be mainly attenuated by the plural intermediate slit pairs 20. Accordingly, vibrations occurring in operation can be efficiently attenuated over a wide range from low frequencies to high frequencies. Further, in the case where the first and second slits 22 and 24 of each intermediate slit pair 20 and the arcuate portion 16 of each outer slit 12 are filled with a viscous material containing a colored pigment except a white pigment and a black pigment, visual inspection as to whether or not all the slits are completely filled with or defectively filled with the viscous material can be easily made, thereby preventing the production of defectives.

What is claimed is:

1. A disk cutter comprising:
   an annular disk-shaped base adapted to be driven about an axis of rotation;
   a plurality of tip supports formed along the outer circumference of said base integrally therewith so that a gullet is defined between adjacent ones of said tip supports;
   a plurality of tip inserts respectively fixed to said tip supports;
   a plurality of outer slits formed at an outer circumferential portion of said base so as to be arranged at given intervals, each of said outer slits having an outer end opening to said gullet; and
   a plurality of intermediate slit pairs formed at a radially intermediate portion of said base so as to be arranged at said given intervals in such a manner that each of said intermediate slit pairs is located between adjacent ones of said outer slits;
   each of said intermediate slit pairs having a substantially J-shaped first slit and a substantially inverted J-shaped second slit arranged in point symmetrical relationship with said first slit;
   said first and second slits having straight portions parallel to each other, the spacing W between said straight portions of said first and second slits and the thickness t of said base being set so as to satisfy the relation of $0.4 \leq W/t \leq 1.1$;
   each of said first and second slits being filled with a viscous material having viscosity at ordinary temperature.

2. A disk cutter according to claim 1, wherein each of said outer slits comprises a radially extending outer portion having a larger width, an arcuate portion having a smaller width and continuing at one end to the inner end of said outer portion, and a hole continuing to the other end of said arcuate portion, said arcuate portion being filled with said viscous material.

3. A disk cutter according to claim 2, wherein said viscous material contains a colored pigment except a white pigment and a black pigment.

* * * * *